United States Patent
Chatterjee et al.

(10) Patent No.: US 8,533,112 B1
(45) Date of Patent: Sep. 10, 2013

(54) METHOD AND SYSTEM FOR PROVIDING A DIGITAL MONEY INFRASTRUCTURE USING MOBILE TELEPHONY

(75) Inventors: Surojit Chatterjee, Bangalore (IN); Varun Soundararajan, West Lafayette, IN (US)

(73) Assignee: Google Inc., Mountain View, CA (US)

(*) Notice: Subject to any disclaimer, the term of this patent is extended or adjusted under 35 U.S.C. 154(b) by 1108 days.

(21) Appl. No.: 12/349,577

(22) Filed: Jan. 7, 2009

(51) Int. Cl.
*G06Q 40/00* (2012.01)

(52) U.S. Cl.
USPC .......... 705/39; 705/64; 705/65; 705/38; 235/379; 235/380; 235/382

(58) Field of Classification Search
USPC .......... 705/39, 64, 65; 235/379, 380, 382
See application file for complete search history.

(56) References Cited

U.S. PATENT DOCUMENTS

| | | | |
|---|---|---|---|
| 5,577,103 A * | 11/1996 | Foti | 455/412.1 |
| 6,206,283 B1 * | 3/2001 | Bansal et al. | 235/379 |
| 6,439,456 B1 * | 8/2002 | Bansal et al. | 235/379 |
| 7,370,012 B2 * | 5/2008 | Karns et al. | 705/39 |

OTHER PUBLICATIONS

Wikipedia website (en.wikipedia.org/wiki/network_switching_subsystem) definition of network switching subsytem.*

* cited by examiner

*Primary Examiner* — Daniel Felten
(74) *Attorney, Agent, or Firm* — Johnson, Marcou & Isaacs, LLC (57) ABSTRACT

Systems and methods for providing a mobile telephony infrastructure for transferring electronic payments are provided. A user provides an amount of cash and a mobile telephone number to a distributor who then communicates to a payment processor the telephone number and the amount of cash provided. The payment processor then sends a payment code to the mobile telephone of the user. The user then can show the payment code to a merchant or other payment recipient to provide payment. A merchant can scan or otherwise receive the payment code from the user's mobile telephone, and transmit the code along with the amount of money to be received to the payment processor. The payment processor then credits the merchant's account with the appropriate amount of money, and transmits a new payment code to the user's mobile telephone reflecting the amount of money remaining after the payment to the merchant.

47 Claims, 5 Drawing Sheets

METHOD AND SYSTEM FOR PROVIDING A DIGITAL MONEY INFRASTRUCTURE USING MOBILE TELEPHONY

TECHNICAL FIELD

The invention generally relates to communicating and relaying financial information. More specifically, the invention relates to providing a mobile telephony infrastructure for transferring electronic payments.

BACKGROUND

Electronic commerce has been increasingly common since the advent of the Internet. This development has led to the increase in the available forms of electronic payments. For example, electronic payments can be facilitated by a variety of payment companies. Examples of payment companies can include banks, credit card companies, and other financial institutions. Thus, if an entity seeks to send payment electronically, it may request or allow an associated payment company to transfer payment to a payee.

More recently, payment gateways have emerged as mechanisms to facilitate electronic payments. These payment gateways may receive bank account, credit card, or other payment information from end users seeking to use the payment gateway for electronic transactions. During a specific transaction, an end user may seek to send payment to a vendor or another receiving party, and may authorize the payment gateway to send such payment on the end user's behalf. The payment gateway may simultaneously withdraw the payment from the end user's bank account, credit card, or other source of payment, and then provide the payment to the receiving party.

A principal advantage of such a service is that the end user need not provide any financial information directly to the receiving party, with whom the end user may not have a pre-existing relationship. However, this system cannot be used by end users without bank accounts, credit cards, or similar electronic financial instruments, such as those who rely solely or largely on physical cash for completing transactions.

A need in the art therefore exists for a system that overcomes one or more of the above-described limitations.

SUMMARY OF THE INVENTION

In one aspect, a computer-implemented method for associating digital money with a user can include receiving an indication of the user depositing with a distributor a first amount of physical cash to be associated with a telephone number of the user, associating a second amount of cash based on the first amount of physical cash with the telephone number of the user, and transmitting a text message to the telephone number of the user. The indication of the user can be received from a computer associated with the distributor. The text message can be configured to be displayed on a mobile telephone associated with the telephone number, and can include a payment code with data indicating the second amount of cash.

In another aspect, a computer-implemented method for receiving a digital money payment from a user can include receiving payment data associated with the user, debiting a debit amount of digital money from the user, crediting a credit amount of digital money that is based on the debit amount to a receiving party, and transmitting a text message to a telephone number of user. The payment data can include a first reference code based on an initial amount of digital money and the debit amount of digital money to be debited from the user. The text message transmitted can include a second reference code that can indicate an updated amount of digital money, and can be configured to be displayed on a mobile telephone associated with the telephone number.

In another aspect, a system for receiving a digital money payment from a user can include one or more information processing units for executing programs and an engine executable on the one or more information processing units. The engine can include instructions for receiving payment data associated with the user. The payment data can include a first reference code based on an initial amount of digital money and a debit amount of digital money to be debited from the user. The engine can also include instructions for debiting the debit amount of digital money from the user, crediting a credit amount of digital money that is based on the debit amount to a receiving party, and transmitting a text message that includes a second reference code to a telephone number of user. The second reference code can indicate an updated amount of digital money, and the text message can be configured to be displayed on a mobile telephone associated with the telephone number.

In another aspect, a computer program product can include a computer-readable medium having computer-readable program code embodied therein for associating digital money with a user. The computer-readable program code can include computer-readable program code for receiving an indication of the user depositing with a distributor a first amount of physical cash to be associated with a telephone number of the user, associating a second amount of cash based on the first amount of physical cash with the telephone number of the user, and transmitting a text message comprising a payment code to the telephone number of the user. The indication can be received from a computer associated with the distributor. The text message can be configured to be displayed on a mobile telephone associated with the telephone number. The payment code can include data indicating the second amount of cash.

These and other aspects, objects, and features of the present invention will become apparent from the following detailed description of the exemplary embodiments, read in conjunction with, and reference to, the accompanying drawings.

DETAILED DESCRIPTION OF THE EXEMPLARY EMBODIMENTS

One or more aspects of the invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description, read in conjunction with the figures illustrating the program flow.

Figure 1:
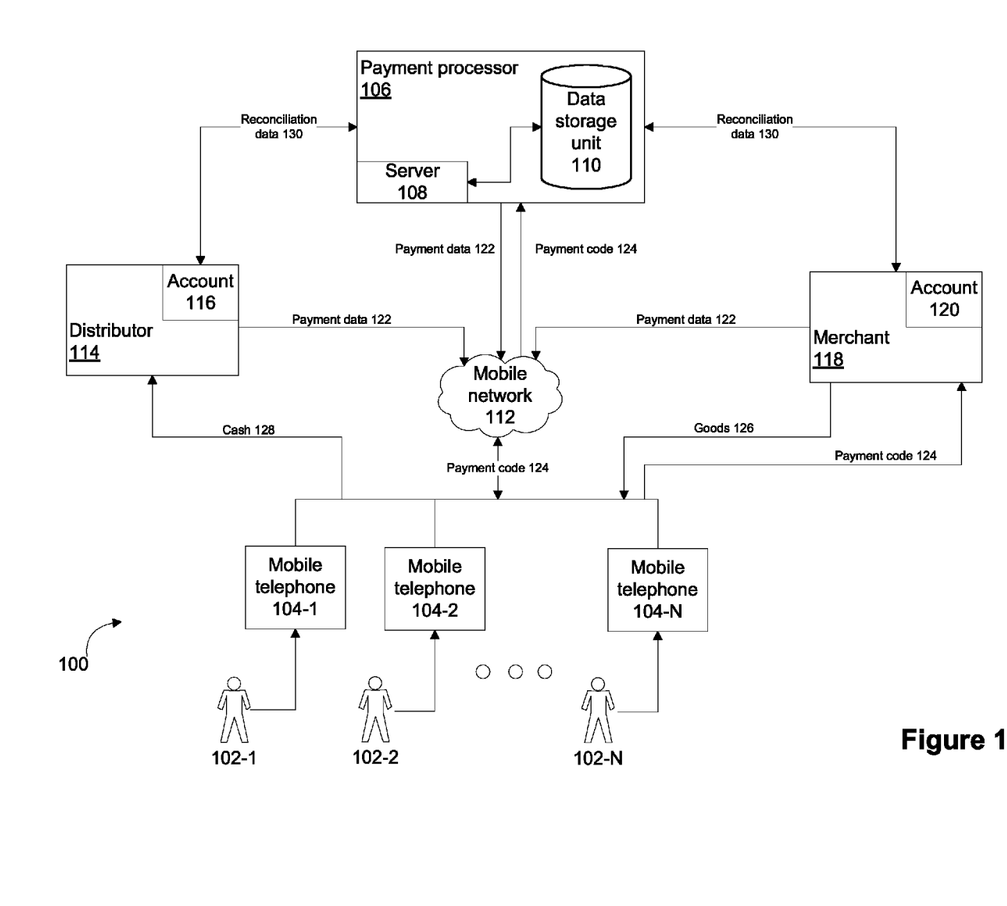
FIG. 1 is a block diagram depicting a system for providing a mobile telephony infrastructure for transferring electronic payments according to an exemplary embodiment.

A method and system for providing a mobile telephony infrastructure for transferring electronic payments will now be described with reference to FIGS. 1-5, which depict representative or illustrative embodiments of the invention. FIG. 1 is a block diagram depicting a system 100 for providing a mobile telephony infrastructure for transferring electronic payments according to an exemplary embodiment. The exemplary system 100 includes a payment processor 106 that includes a server 108 and a data storage unit 110. In exemplary embodiments, the server 108 can include an information processing unit such as a computer, and the data storage unit 110 can be a database stored therein.

The payment processor 106 is in communication with a plurality of users 102 via a mobile network 112, with each user 102 having a mobile telephone 104 to communicate with the payment processor 106. Examples of mobile networks 112 can include cellular networks, GPRS, GSM, CDMA, or other suitable networks that will be recognized by one of ordinary skill in the art having the benefit of the present disclosure. As shown in FIG. 1, payment codes 124 are transmitted between the payment processor 106 and the mobile telephones 104 via the mobile network 112. In exemplary embodiments, these payment codes 124 can represent amounts of digital money that can be spent by a user 102, are to be credited to a recipient, or are to be debited from a user 102. In one embodiment, the payment codes 124 can include a reference code (such as a string of text characters) sent via short messaging service (SMS) protocol. In an alternative embodiment, the payment codes 124 can include a barcode sent via SMS or multimedia messaging service (MMS) protocol. In various other embodiments, the payment codes 124 can include a variety of other data or messages that represent amounts of electronic payments and can be sent via a variety of other protocols, as will be recognized by one of ordinary skill in the art having the benefit of the present disclosure.

As shown in FIG. 1, the payment processor 106 also is in communication with a distributor 114 via the mobile network 112. The distributor 114 can include any entity that receives payment from a user 102 and communicates payment data 122 that indicates the receipt of the payment to the payment processor 106. In an exemplary embodiment, the distributor 114 can include a grocery store or convenience store that accepts cash 128 from a user 102, and then communicates to the payment processor 106 the amount of cash 128 that the user 102 provided. In an alternative embodiment, the distributor 114 can include a machine capable of accepting cash 128 (such as through an interface used in vending machines) that is in communication with a payment processor 106. In another alternative embodiment, the distributor 114 can accept other forms of payment in addition to cash 128, such as credit card payments. In yet another alternative embodiment, the distributor 114 may communicate with the payment processor 106 via another network, such as the Internet, either in addition to—or instead of—via the mobile network 112.

The distributor 114 also can have an associated account 116. The account 116 can include a bank account, credit card account, or any other suitable type of account 116 that can store, receive, and/or transmit payments to or from the payment processor 106. Such an account 116 can be used for reconciling payments with the payment processor 106. In an exemplary embodiment, reconciling payments with the payment processor 106 can include debiting from the distributor's 114 associated account 116 by communicating reconciliation data to the distributor's 114 account 116. The reconciliation data can include instructions to the distributor's 114 bank account to withdraw payment from the account and credit it to the payment processor 106.

In an exemplary embodiment, as shown in FIG. 1, the payment processor 106 also can be in communication with a merchant 118 via the mobile network 112. In an alternative embodiment, the payment processor 106 can communicate with the payment processor 106 via another network, such as the Internet, either in addition to—or instead of—via the mobile network 112. The merchant 118 can include any store, business, or any other entity offering goods 126 and/or services for sale in exchange for payment.

In an exemplary embodiment, the merchant 118 also can have an associated account 120. The account 120 can include a bank account, credit card account, or any other suitable type of account 120 that can store, receive, and/or transmit payments to or from the payment processor 106. Such an account 120 can be used for reconciling payments with the payment processor 106. In an exemplary embodiment, reconciling payments with the payment processor 106 can include crediting to from the merchant's 118 associated account 120 by communicating reconciliation data to the merchant's 118 account 120. The reconciliation data can include instructions to the merchant's 118 bank account to credit payment to the account and debit it from the payment processor 106.

As shown in the embodiment illustrated in FIG. 1, the merchant 118 can include a point-of-sale terminal. The point-of-sale terminal can include a payment code 124 reader capable of communicating with the mobile telephone 104 of the user 102 to receive payment from the user 102. For example, in one embodiment, the payment code 124 can include a barcode representing a $10 credit that was sent to the user's 102 mobile telephone 104 by the payment processor 106 via SMS protocol. The payment processor 106 then can reconcile the $10 credit with the cost of the products and/or services the user 102 seeks to purchase from the merchant 118. This process can be performed according to a variety of methods, some of which will be described in detail with reference to FIGS. 2-5.

Figure 2:
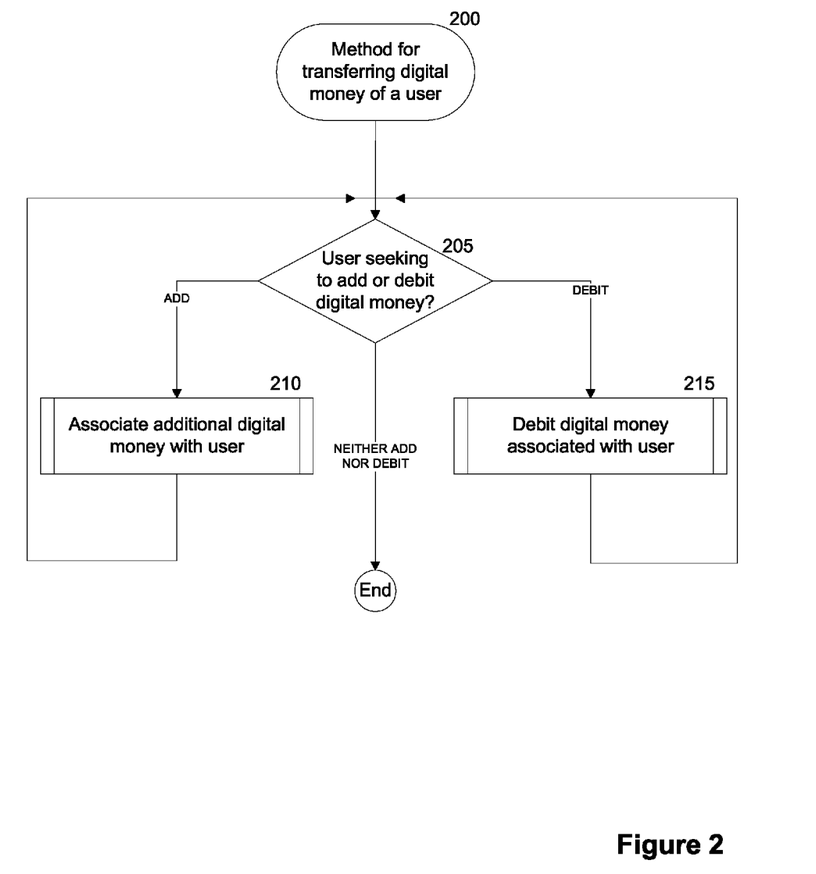
FIG. 2 is a flow diagram depicting a method for transferring electronic payments of a user with a mobile telephony infrastructure according to an exemplary embodiment.

FIG. 2 is a flow diagram depicting a method 200 for transferring electronic payments of a user 102 with a mobile telephony infrastructure according to an exemplary embodiment. In step 205, the method 200 determines whether a user 102 is seeking to add digital money to be associated with the user 102 or debit digital money that had previously been associated with the user 102. If the user 102 seeks to add digital money, the method 200 branches to step 210, where additional digital money is associated with the user 102. If the user 102 seeks to debit digital money, the method 200 branches to step 215, where digital money associated with the user 102 is debited. Alternatively, if the user 102 does not wish to add or debit digital money, the method 200 ends.

In step 210, additional digital money is associated with the user 102. In an exemplary embodiment, additional digital money can be associated with the user 102 through a transaction initiated by the user 102. For example, the user 102 can deposit money such as cash 128 with a distributor 114, and the distributor 114 can communicate with the payment processor 106 and convert the deposited money to digital money to be associated with the user 102. One method of implementing step 210 of such an embodiment will be discussed in more detail with reference to FIG. 3. After step 210, the method 200 returns to step 205, where the method 200 again determines whether a user 102 is seeking to add digital money, debit digital money, or neither.

In step 215, digital money associated with the user 102 is debited. In an exemplary embodiment, digital money already associated with the user 102 can be debited through a transaction initiated by the user 102. In one embodiment, a user 102 may seek to transmit digital money to a merchant 118 as a means for paying for a product or service. In another embodiment, a user 102-1 may seek to transmit digital money to another user 102-2, whether as a gift, to repay a borrowed sum of money, or any other suitable purpose.

Step 215 will be described in more detail with reference to FIG. 5. After step 215, the method 200 returns to step 205, where the method 200 again determines whether a user 102 is seeking to add digital money, debit digital money, or neither.

Figure 3:
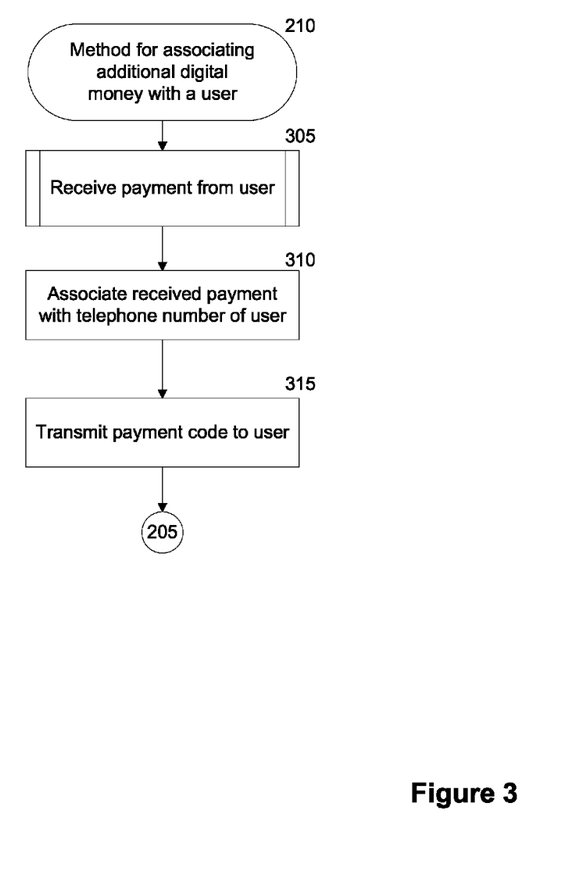
FIG. 3 is a flow diagram depicting a method for associating additional digital money with a user according to an exemplary embodiment.

FIG. 3 is a flow diagram depicting a method 210 for associating additional digital money with a user 102 according to an exemplary embodiment. In step 305, payment is received from the user 102. In an exemplary embodiment, receiving payment from a user 102 can include a distributor 114 receiving payment from a user 102 and then communicating to the payment processor 106 the amount of the payment received from the user 102 and the user's 102 identity. One exemplary method of performing step 305 will be described in more detail with reference to FIG. 4.

In an alternative embodiment, payment can be received directly by the payment processor 106. Such a payment can include a cash 128 payment and/or an electronic form of payment such as a credit card payment.

In step 310, the payment received in step 305 is associated with a telephone 104 number of the user 102. In an exemplary embodiment, the user 102 can provide a telephone 104 number to a distributor 114 substantially contemporaneously with providing a payment, as described previously with reference to step 305. The telephone 104 number provided by the user 102 can be the telephone 104 number of a mobile telephone 104 owned by or otherwise associated with the user 102. In an alternative embodiment, the telephone 104 number provided by the user 102 can be associated with any type of telephone or other device that is capable of receiving and/or sending messages via SMS, MMS, or similar protocols.

In an exemplary embodiment, the distributor 114 receiving the user's 102 telephone 104 number can communicate the telephone 104 number to the payment processor 106. In an alternative embodiment, such as an embodiment in which the user 102 provides payment directly to the payment processor 106, the user 102 can likewise provide the telephone 104 number directly to the payment processor 106.

In step 315, a payment code 124 is transmitted to the user 102. As discussed previously with reference to FIG. 1, the payment code 124 can include a barcode that can be scanned or reference code that can be transmitted via SMS, MMS, or other protocols. In one embodiment, the payment code 124 can represent an amount of money. The amount of money represented by the payment code 124 can be the amount of the payment received from the user 102 in step 305. In another embodiment, the amount of money represented by the payment code 124 can be the amount of the payment received from the user 102 in step 305, less a transaction fee charged by the payment processor 106 and/or distributor 114. In an exemplary embodiment, the payment processor 106 can store in the data storage unit 110 the amount of digital money associated with each payment code 124. Optionally, the data storage unit 110 also can store the telephone 104 number of the user 102 associated with each payment code 124.

In an alternative embodiment, the payment code 124 can represent an amount of money corresponding to the amount of the payment received from the user 102 in step 305, plus the sum of payments previously received from the user 102, less any digital money spent by the user 102. For example, if a user 102 deposits $10 with a distributor 114, receives a payment code 124 representing the $10 payment, makes a digital money payment of $3 to a recipient, and then deposits another $10 with the distributor 114, the user 102 may receive a payment code 124 representing a $17 balance. In such an embodiment, the payment processor 106 can store in the data storage unit 110 each user's 102 telephone 104 number and the amount of digital money associated therewith at any given time. After step 315, the method 210 proceeds to step 205, as described previously with reference to FIG. 2.

Figure 4:
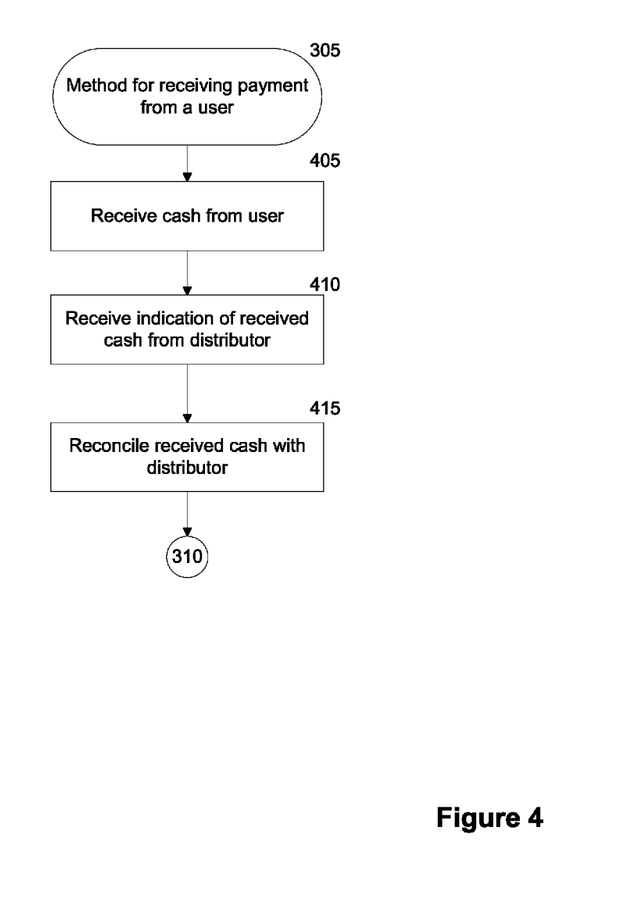
FIG. 4 is a flow diagram depicting a method for receiving payment from a user according to an exemplary embodiment.

FIG. 4 is a flow diagram depicting a method 305 for receiving payment from a user 102 according to an exemplary embodiment. In step 405, a distributor 114 receives cash 128 from a user 102. In exemplary embodiments, as described previously with reference to FIG. 1, the distributor 114 can include any entity that receives payment from a user 102 and communicates the receipt of the payment to the payment processor 106. Such entities can include a store or vending machine in communication with the payment processor 106. In an alternative embodiment, the user 102 may provide a form of payment other than cash 128—such as a check or credit card—to the distributor 114.

In step 410, the payment processor 106 receives an indication of received cash 128 from the distributor 114. In an exemplary embodiment, the indication of received cash 128 communicated by the distributor 114 to the payment processor 106 corresponds to the cash 128 received from the user 102 in step 405. In one embodiment, the distributor 114 can communicate the indication of received cash 128 to the payment processor 106 via SMS protocol. In a particular embodiment, the distributor 114 can utilize a mobile telephone 104 to communicate with the payment processor 106. Alternatively, the distributor 114 can utilize a computer or other information processing unit capable of communicating with the payment processor 106 via SMS protocol or over a network such as the Internet.

In an exemplary embodiment, the distributor 114 can communicate the amount of cash 128 received from the user 102 to the payment processor 106. In a particular embodiment, the distributor 114 can communicate to the payment processor 106 the telephone 104 number of the user 102 along with the amount of cash 128 received from the user 102.

In step 415, the payment processor 106 reconciles the received cash 128 with the distributor 114. In one embodiment, reconciling the received cash 128 can include transferring a payment from the distributor 114 to the payment processor 106. In an exemplary embodiment, the amount of the payment from the distributor 114 to the payment processor 106 can be equal to the amount of the payment received from the user 102 in step 305. Alternatively, the amount of the payment from the distributor 114 to the payment processor 106 can be equal to the amount of the payment received from the user 102 in step 305, less a fee or commission that the distributor 114 is entitled to keep. The amount of the fee or commission that the distributor 114 is entitled to keep can be determined by an agreement between the distributor 114 and payment processor 106.

In an exemplary embodiment, distributors 114 can register with the payment processor 106 to facilitate the reconciliation process. In a particular embodiment, a distributor 114 can register with the payment processor 106 prior to being authorized by the payment processor 106 to accept payments from users 102. Registering with the payment processor 106 can include providing a bank account, credit card number, or other form of payment. Thus, in one embodiment, when a distributor 114 receives cash 128 from a user 102, the distributor 114 can keep the cash 128 received, and transfer an electronic payment to the payment processor 106 using the form of payment registered with the payment processor 106.

In an alternative exemplary embodiment, instead of transferring payments to the payment processor 106 each time the distributor 114 receives a payment from a user 102, the distributor 114 can aggregate payments received from users 102 over a period of time. For example, if on one day, five different users 102 each provide $10 to the distributor 114, the distributor 114 can aggregate these payments and transmit a single $50 payment to the payment processor 106 at the end of the day. Payments can be aggregated over any suitable time period, such as every hour, day, or week. After step 415, the method 305 proceeds to step 310, as described previously with reference to FIG. 3.

Figure 5:
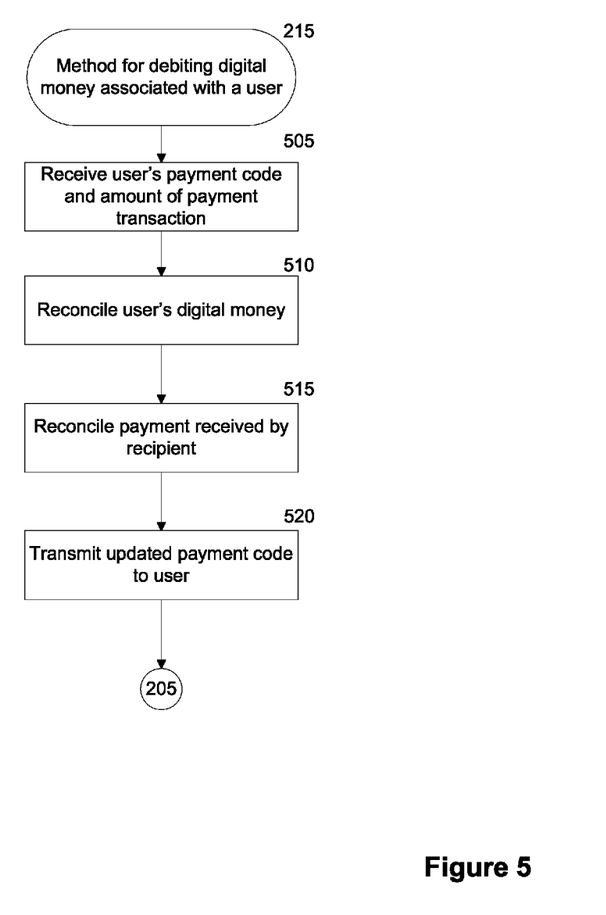
FIG. 5 is a flow diagram depicting a method for debiting digital money associated with a user according to an exemplary embodiment.

FIG. 5 is a flow diagram depicting a method 215 for debiting digital money associated with a user 102 according to an exemplary embodiment. In step 505, the user's 102 payment code 124 and the amount of the payment transaction is received. In one embodiment, the user 102 can initiate a communication to the payment processor 106 that includes the payment code 124 and the amount of the payment transaction, as well as a telephone 104 number (or other identifier) of the recipient. For example, in such an embodiment, a first user 102-1 can send a message via SMS protocol to the payment processor 106 that includes a payment code 124 previously received by the first user 102-1 corresponding to an amount of digital money, the telephone 104 number of a second user 102-2 (i.e., the recipient of the digital money), and the amount of digital money to be transferred to the recipient.

In an alternative embodiment, the intended recipient of the digital money can initiate a communication to the payment processor 106 that includes the payment code 124 and the amount of the payment transaction. Such an embodiment may be common where a user 102 desires to purchase a good 126 or service from a merchant 118 by using digital money. For example, in such an embodiment, a merchant 118 can read or receive a payment code 124 on a user's 102 mobile telephone 104, and then communicate payment data 122 to the payment processor 106. The payment data 122 can include the payment code 124 and an amount of digital money to be debited from the user 102 in exchange for the goods 126 or services purchased. In another exemplary embodiment, merchants 118 may register with the payment processor 106 to facilitate transactions with the payment processor 106. As described previously with reference to the registration of distributors 114, registering with the payment processor 106 can include providing a bank account or other means of crediting the merchant 118. Thus, in one embodiment, when a merchant 118 accepts a digital payment from a user 102 in exchange for products and/or services, the payment processor 106 can credit the merchant's 118 bank account provided during registration.

In a particular exemplary embodiment, where the payment code 124 includes a barcode than can be read or scanned, the merchant 118 can receive the payment code 124 from the user's 102 mobile telephone 104 by scanning the barcode displayed on the telephone at the merchant's 118 point-of-sale. The scanning can be performed by a barcode scanner that is in communication with a telephone capable of communicating with the payment processor 106 via SMS protocol. Alternatively, the barcode scanner can be in communication with a computer that communicates with the payment processor 106 via the Internet or other network. In an alternative embodiment, whether the payment code 124 includes a barcode or another type of payment code 124 (such as a text-based reference code), the merchant 118 can manually enter the payment code 124 into a message at the merchant's 118 point-of-sale and transmit that message to the payment processor 106 via SMS protocol.

In one embodiment, when the merchant 118 communicates the payment code 124 and the amount of the transaction to the payment processor 106, the merchant 118 also can provide the merchant's 118 telephone number (or other identifier). This information may be provided automatically as part of the communication, as generally occurs with communications via SMS protocol.

In various exemplary embodiments, a variety of security measures can be used to prevent fraudulent uses of payment codes 124 by unauthorized users 102. In one such embodiment, after the user's 102 payment code 124 and the amount of the payment is received by the payment processor 106, the payment processor 106 can send a message via SMS or other protocols to the user 102, requesting the user 102 to confirm these details of the transaction. If the transaction is fraudulent, then the user 102 would not confirm the transaction and the transfer of digital money would not occur.

In step 510, the paying user's 102 digital money is reconciled. In an exemplary embodiment, after the payment processor 106 receives the user's 102 payment code 124 and the amount to be debited in step 505, the payment processor 106 then can determine the amount of digital money that corresponds to the payment code 124. In a particular embodiment, this determination can be accomplished by querying the data storage unit 110 with the server 108 to identify the amount of digital money that corresponds with the received payment code 124. Then, if the amount of digital money associated with received payment code 124 is less than the amount to be debited, the payment processor 106 can transmit an error or insufficient funds message to the merchant 118, intended recipient, and/or paying user 102. Otherwise, the method 215 continues to step 515.

In step 515, the payment received by the recipient is reconciled. As described previously with reference to step 505, the recipient of the payment can be entities such as another user 102 or a merchant 118. Regardless of the type of recipient, the identity of the recipient first must be identified, which can be accomplished by analyzing the communication received by the payment processor 106 in step 505. If the recipient is a merchant 118 or other entity that has provided a bank account to the payment processor 106, then the amount of the payment specified in step 505 can be credited to the recipient's bank account by communicating reconciliation data to the recipient's account 120. The reconciliation data can include instructions to the recipient's bank account to withdraw payment from the payment processor 106 and credit it to the recipient's account 120. Alternatively, reconciling the account 120 of the payment's recipient can include transmitting a payment code 124 to the recipient, with the payment code 124 corresponding to the amount of the payment specified in step 505.

In an alternative embodiment, merchants 118 can have a holding account (not shown) with the payment processor 106. Holding accounts can include money stored with the payment processor 106 that is associated with specific merchants 118. These holding accounts can facilitate transactions. For example, if a merchant 118 receives digital money from a user 102 and communicates the receipt of the digital money to the payment processor 106, the payment processor 106 can credit the merchant's 118 holding account instead of directly crediting the merchant's 118 bank account as described previously. Crediting an internal holding account rather than the merchant's 118 bank account can occur more efficiently and quickly. In another exemplary embodiment, merchants 118 can request money be transferred from the holding account to the merchant's 118 bank account.

In step 520, an updated payment code 124 is transmitted to the user 102. In one embodiment, the updated payment code 124 can represent the amount of the digital money associated with the payment code 124 transmitted in step 505, less the amount of the payment specified in step 505. In another embodiment, the amount of money represented by the updated payment code 124 can be further reduced to account for a transaction fee charged by the payment processor 106 and/or merchant 118. After step 520, the method 215 proceeds to step 205, as described previously with reference to FIG. 2.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein.

For example, one exemplary optional feature can include paying interest to users 102, as well as merchants 118 and/or distributors 114 having holding accounts with the payment processor 106. In an exemplary embodiment, the amount of interest paid can be based on the amount of the active payment codes 124 that each user 102 has. For example, a user 102 that deposits $100 with a distributor 114 and receives a payment code 124 corresponding with that $100 payment but does not spend the $100 of digital money for six months may be credited with six months of interest on the $100 balance. In a particular exemplary embodiment, interest payments can be credited to the users 102 by transmitting a payment code 124 corresponding with the interest payment to each applicable user 102.

Additionally, although the foregoing disclosure describes transactions involving one payer and one recipient, other types of transactions are possible. For example, certain entities such as banks, insurance companies, contest administrators, or employers can transfer digital payments to multiple users 102. Specifically, an employer that has registered with the payment processor 106 and provided a form of payment thereto or that has received a payment code 124 from the payment processor 106 can communicate to the payment processor 106 a list of telephone 104 numbers associated with users 102 to whom to make digital payments. The communication also can include the amount of digital money to transfer to each of the users 102 receiving payments.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for associating digital money with a user, the method comprising the steps of:
    receiving, by a computer, an indication of the user depositing with a distributor a first amount of physical cash to be associated with a telephone number of the user, the indication being received from a computer associated with the distributor;
    associating, by the computer, a second amount of digital money based on the first amount of physical cash with the telephone number of the user;
    transmitting, by the computer, a first text message comprising a payment code to the telephone number of the user, the first text message being configured to be displayed on a mobile telephone associated with the telephone number, wherein the payment code comprises data indicating the second amount of digital money;
    calculating, by the computer, an amount of interest to be credited to the user; and
    transmitting, by the computer, a second text message comprising an interest payment code to the telephone number of the user, the second text message being configured to be displayed on a mobile telephone associated with the telephone number, wherein the interest payment code comprises data indicating the amount of interest.

2. The computer-implemented method of claim 1, wherein the step of receiving an indication of the user depositing with a distributor a first amount of physical cash to be associated with a telephone number of the user comprises the step of receiving the telephone number of the user from the distributor.

3. The computer-implemented method of claim 1, further comprising the step of registering the distributor prior to receiving the indication of the user depositing the first amount of physical cash from the distributor.

4. The computer-implemented method of claim 3, wherein the step of registering the distributor comprises the step of receiving a payment account identifier from the distributor.

5. The computer-implemented method of claim 4, wherein the payment account identifier comprises one or more of a bank account number and a credit card number.

6. The computer-implemented method of claim 4, further comprising the step of charging the distributor a third amount based on the first amount of physical cash by charging an account corresponding to the payment account identifier.

7. The computer-implemented method of claim 1, wherein the first and second text messages are transmitted via short messaging service protocol.

8. The computer-implemented method of claim 1, wherein the payment code comprises a reference code comprising a string of at least one text character.

9. The computer-implemented method of claim 1, wherein the payment code comprises a barcode configured to be scanned by a barcode scanner.

10. A computer-implemented method for receiving a digital money payment from a user, the method comprising the steps of:
receiving, by a computer, payment data associated with the user, the payment data comprising:
a first reference code based on an initial amount of digital money, and
a debit amount of digital money to be debited from the user;
debiting, by the computer, the debit amount of digital money from the user;
crediting, by the computer, a credit amount of digital money to a receiving party, the credit amount being based on the debit amount, wherein the credit amount of digital money equals the debit amount less a transaction fee; and
transmitting, by the computer, a text message comprising a second reference code to a telephone number of the user, the text message being configured to be displayed on a mobile telephone associated with the telephone number,
wherein the first reference code indicates the initial amount, and
wherein the second reference code indicates an updated amount of digital money.

11. The computer-implemented method of claim 10, wherein the receiving party comprises a merchant.

12. The computer-implemented method of claim 10, wherein the step of receiving payment data associated with the user comprises receiving payment data associated with the user from the receiving party.

13. The computer-implemented method of claim 10, wherein the step of receiving payment data associated with the user comprises receiving payment data associated with the user from the user.

14. The computer-implemented method of claim 10, wherein the step of receiving payment data associated with the user comprises the step of receiving a text message comprising the payment data.

15. The computer-implemented method of claim 14, wherein the step of receiving a text message comprising the payment data comprises the step of receiving the text message from a merchant, the merchant having acquired the payment data from the user by receiving the first reference code,
wherein the first reference code comprises a barcode, and
wherein the merchant received the first reference code by scanning the barcode.

16. The computer-implemented method of claim 10, wherein the updated amount of digital money equals the initial amount less the debit amount.

17. A system for receiving a digital money payment from a user, the system comprising:
one or more information processing units for executing programs; and
an engine executable on the one or more information processing units, the engine comprising:
instructions for receiving payment data associated with the user, the payment data comprising:
a first reference code based on an initial amount of digital money, and
a debit amount of digital money to be debited from the user;
instructions for debiting the debit amount of digital money from the user;
instructions for crediting a credit amount of digital money to a receiving party, the credit amount being based on the debit amount, wherein the credit amount of digital money equals the debit amount less a transaction fee; and
instructions for transmitting a text message comprising a second reference code to a telephone number of the user, the text message being configured to be displayed on a mobile telephone associated with the telephone number,
wherein the first reference code indicates the initial amount, and
wherein the second reference code indicates an updated amount of digital money.

18. The system of claim 17, wherein the receiving party comprises a merchant, and
wherein the engine further comprises instructions for registering the merchant.

19. A computer program product comprising:
a non-transitory computer-readable medium having computer-readable program code embodied therein for associating digital money with a user, the computer-readable program code in the computer program product comprising:
computer-readable program code for receiving an indication of the user depositing with a distributor a first amount of physical cash to be associated with a telephone number of the user, the indication being received from a computer associated with the distributor;
computer-readable program code for associating a second amount of digital money based on the first amount of physical cash with the telephone number of the user;
computer-readable program code for transmitting a first text message comprising a payment code to the telephone number of the user, the first text message being configured to be displayed on a mobile telephone associated with the telephone number, wherein the payment code comprises data indicating the second amount of digital money;
computer-readable program code for calculating an amount of interest to be credited to the user; and
computer-readable program for transmitting a second text message comprising an interest payment code to the telephone number of the user, the second text message being configured to be displayed on a mobile telephone associated with the telephone number, wherein the interest payment code comprises data indicating the amount of interest.

20. The computer program product of claim 19, wherein the payment code comprises a reference code comprising a string of at least one text character.

21. The computer program product of claim 19, wherein the payment code comprises a barcode configured to be scanned by a barcode scanner.

22. The computer program product of claim 19, wherein the computer-readable program code for receiving an indication of the user depositing with a distributor a first amount of physical cash to be associated with a telephone number of the user comprises computer-readable program code for receiving the telephone number of the user from the distributor.

23. The computer program product of claim 19, further comprising computer-readable program code for registering the distributor prior to receiving the indication of the user depositing the first amount of physical cash from the distributor.

24. The computer program product of claim 23, wherein the computer-readable program code for registering the distributor comprises computer-readable program code for receiving a payment account identifier from the distributor.

25. The computer program product of claim 24, wherein the payment account identifier comprises one or more of a bank account number and a credit card number.

26. The computer program product of claim 24, further comprising computer-readable program code for charging the distributor a third amount based on the first amount of physical cash by charging an account corresponding to the payment account identifier.

27. The computer program product of claim 26, wherein the computer-readable program code for charging the distributor the third amount comprises computer-readable program code for accepting a transfer of the third amount from the account corresponding to the payment account identifier.

28. The computer program product of claim 19, wherein the first and second text messages are transmitted via short messaging service protocol.

29. The computer program product of claim 19, further comprising computer-readable program code for receiving from the distributor a transfer of a third amount based on the first amount of physical cash.

30. The computer program product of claim 29, wherein the third amount equals the amount of physical cash less a distributor fee.

31. The system of claim 17, wherein receiving payment data associated with the user comprises receiving payment data associated with the user from the receiving party.

32. The system of claim 17, wherein receiving payment data associated with the user comprises receiving payment data associated with the user from the user.

33. The system of claim 17, wherein receiving payment data associated with the user comprises the step of receiving a text message comprising the payment data.

34. The system of claim 33, wherein receiving a text message comprising the payment data comprises receiving the text message from a merchant, the merchant having acquired the payment data from the user by receiving the first reference code, wherein the first reference code comprises a barcode, and wherein the merchant received the first reference code by scanning the barcode.

35. The system of claim 17, wherein the updated amount of digital money equals the initial amount less the debit amount.

36. The method of claim 1, further comprising receiving from the distributor a transfer of a third amount based on the first amount of physical cash.

37. The method of claim 6, wherein the third amount equals the amount of physical cash less a distributor fee.

38. The method of claim 6, wherein the step of charging the distributor the third amount comprises accepting a transfer of the third amount from the account corresponding to the payment account identifier.

39. A computer-implemented method for associating digital money with a user, comprising the steps of:
    receiving, by a computer, an indication of the user depositing with a distributor a first amount of physical cash to be associated with a telephone number of the user, the indication being received from a computer associated with the distributor;
    associating, by the computer, a second amount of digital money based on the first amount of physical cash with the telephone number of the user;
    transmitting, by the computer, a text message comprising a payment code to the telephone number of the user, the text message being configured to be displayed on a mobile telephone associated with the telephone number, wherein the payment code comprises data indicating the second amount of digital money;
    registering, by the computer, the distributor prior to receiving the indication of the user depositing the first amount of physical cash from the distributor;
    receiving, by the computer, a payment account identifier from the distributor; and
    charging, by the computer, the distributor a third amount based on the first amount of physical cash by charging an account corresponding to the payment account identifier.

40. The method of claim 39, wherein the step of receiving an indication of the user depositing with a distributor a first amount of physical cash to be associated with a telephone number of the user comprises receiving the telephone number of the user from the distributor.

41. The method of claim 39, wherein the payment account identifier comprises one or more of a bank account number and a credit card number.

42. The method of claim 39, wherein the text message is transmitted via short messaging service protocol.

43. The method of claim 39, wherein the payment code comprises a reference code comprising a string of at least one text character.

44. The method of claim 39, wherein the payment code comprises a barcode configured to be scanned by a barcode scanner.

45. The method of claim 39, further comprising the steps of:
    calculating an amount of interest to be credited to the user; and
    transmitting a text message comprising an interest payment code to the telephone number of the user, the text message being configured to be displayed on a mobile telephone associated with the telephone number,
    wherein the interest payment code comprises data indicating the amount of interest.

46. The method of claim 39, wherein the third amount equals the amount of physical cash less a distributor fee.

47. The method of claim 39, wherein the step of charging the distributor the third amount comprises accepting a transfer of the third amount from the account corresponding to the payment account identifier.

* * * * *